United States Patent [19]
Matheny

[11] Patent Number: 5,810,376
[45] Date of Patent: Sep. 22, 1998

[54] SLED

[76] Inventor: Jamie Matheny, 12617 E. 127th St. South, Broken Arrow, Okla. 74011

[21] Appl. No.: 918,718

[22] Filed: Aug. 22, 1997

[51] Int. Cl.⁶ .................................................. A63C 17/26
[52] U.S. Cl. ................................ 280/87.042; 280/87.021; D12/6
[58] Field of Search .................................. D12/6; 280/8, 280/87.041, 87.042, 7.12, 7.13, 7.14, 87.021

[56] References Cited

U.S. PATENT DOCUMENTS

| | | | |
|---|---|---|---|
| 1,327,123 | 1/1920 | Thomas | 280/87.021 |
| 2,449,336 | 9/1948 | Spitzweiser | 280/8 |
| 3,399,904 | 9/1968 | Schinke | 280/87.042 |
| 4,744,576 | 5/1988 | Scollan, Jr. | 280/87.042 |
| 5,687,977 | 11/1997 | Smith | 280/8 |

FOREIGN PATENT DOCUMENTS

| | | | |
|---|---|---|---|
| WO89/02301 | 3/1989 | European Pat. Off. | 280/87.042 |
| 4140442-A1 | 6/1993 | Germany | 280/87.041 |

*Primary Examiner*—D. Glenn Dayoan
*Assistant Examiner*—Clovia Hamilton
*Attorney, Agent, or Firm*—Molly D. McKay

[57] ABSTRACT

A sled for use on land, on snow and on water. The sled is provided with parallel longitudinal runners on its bottom surface allowing the sled to be used on snow and water and is provided with removably wheels on its bottom surface allowing the sled to be used on land. The removably wheels consist of a front pair of wheels, a rear pair of wheels and at least one side wheel located on each side of the sled.

12 Claims, 3 Drawing Sheets

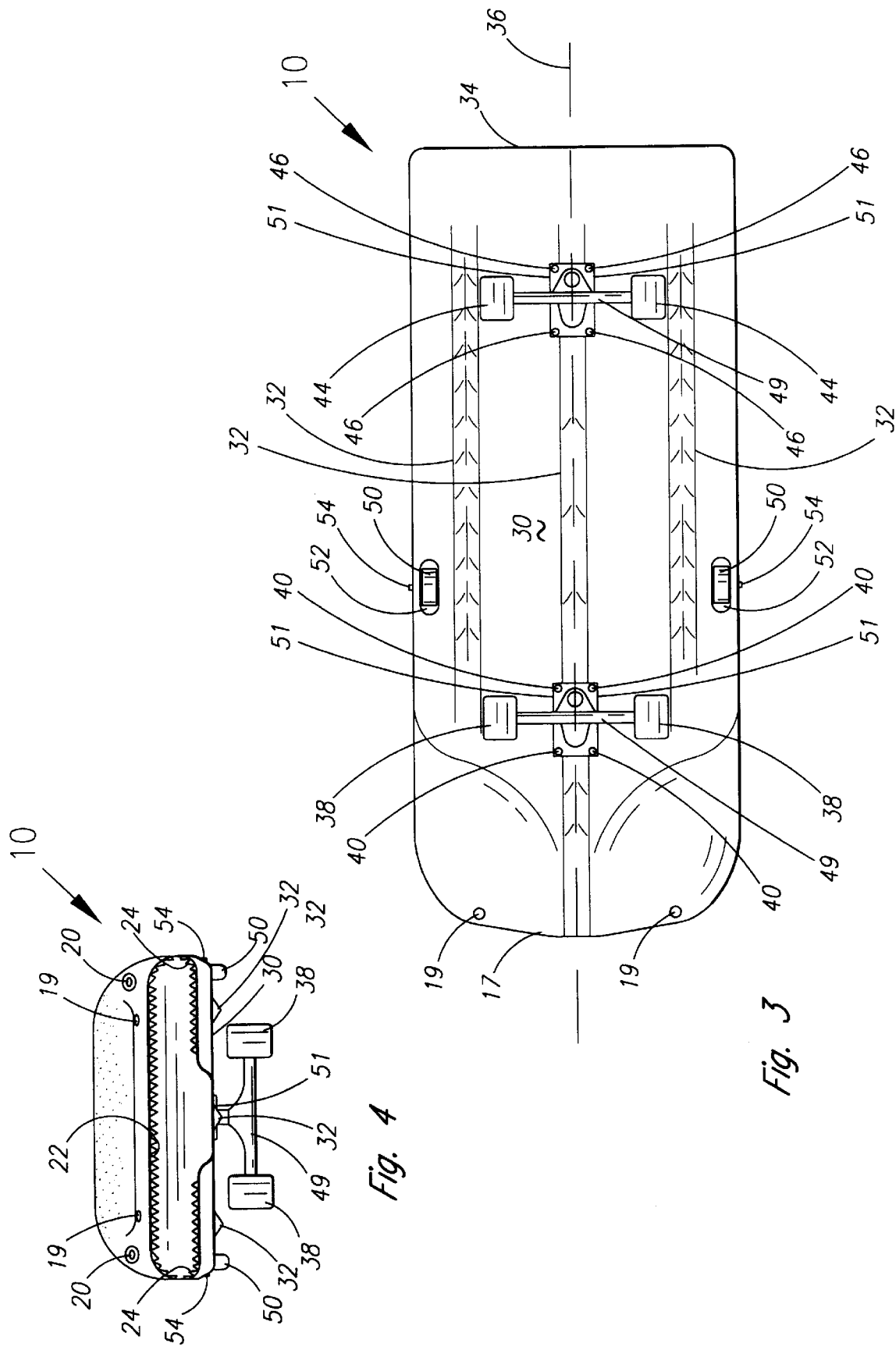

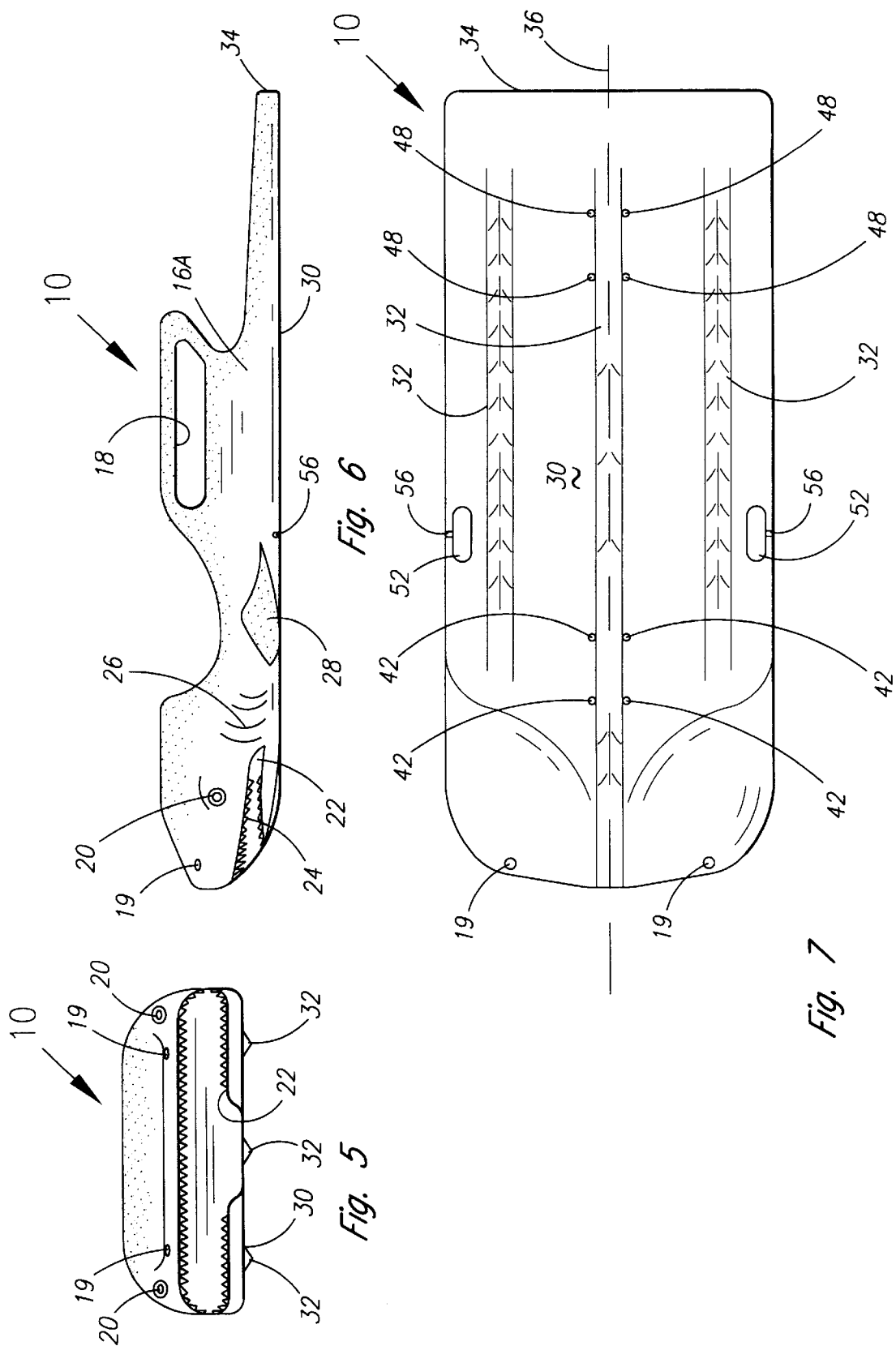

SLED

BACKGROUND OF THE INVENTION

1. Field of the Invention

The present invention is a toy sled which can be employed on a street, on snow or on water.

2. Description of the Related Art

Children of all ages enjoy riding down inclined snow covered surfaces on a sled. A variety of sleds have been designed for sledding on snow. These range from primitive to modern sleds. A primitive snow sled may consist simply of a large piece of cardboard on which a passenger sits as he slides down a snow covered hill. More modern and sophisticated sleds consist of a wooden platform on which one or more passengers may sit and which is mounted onto a pair of parallel runners.

With the advent of motor powered boats and water skiing, sleds have been adapted for use on the water. These sleds generally are constructed of a lightweight material which floats on the water and are normally provided with some means for the passenger to hold onto the sled as the sled is pulled across the water.

On land, toys such as skate boards, toy wagons and scooters are available for use on hard surfaces such as streets and sidewalks where their wheels can roll smoothly.

Until now, however, there has not been a single sled which could be used in all three of these environments, i.e. on snow, on water and on land.

The present invention provides such a sled. Wheels removably attach on the underside of the sled at front and back ends and on each side, allowing the sled to travel on hard surfaces. The wheels may be removed to allow the sled to be used either on snow or on water. The sled is preferably constructed of plastic so the sled will float when placed in water.

SUMMARY OF THE INVENTION

The present invention is a sled for use on water, on snow or on land. The sled is provided with a top surface on which passengers ride. The top surface is provided with non-skid surface areas and optionally provided with foot indentions located at a front end of the sled. Sides of the sled extend upward from the top surface and are provided with hand openings therethrough which can be grasp by passengers as they ride the sled.

The sled is provided with a pair of rope openings at the front end of the sled for attaching a rope to the sled in order that the rope can be used to pull the sled or alternately can be grasped by passengers riding on the sled.

The sled may be decorated to resemble an animal, such as a shark by providing the sled with drawings of a shark mouth, shark teeth, shark gill slits, and shark side fins at appropriate locations on the sled.

A bottom surface of the sled is provided with runners which extend downward slightly from the bottom surface and extend between the front end and an opposite rear end of the sled. Each runner is parallel with the other runners and parallel with a longitudinal axis of the sled.

A front pair of wheels rotatably fasten to a wheel pair axle. The wheel pair axle attaches to a mounting bracket which secures to the bottom surface of the sled. The mounting bracket is secured to the bottom surface by first fasteners which insert through the mounting bracket and removably secure in first fastener openings provided in the bottom surface of the sled adjacent the front end.

Likewise, a rear pair of wheels rotatably fasten to a second wheel pair axle. The second wheel pair axle attaches to a second mounting bracket which secures to the bottom surface of the sled. The second mounting bracket is secured to the bottom surface by second fasteners which insert through the second mounting bracket and removably secure in second fastener openings provided in the bottom surface of the sled adjacent the rear end.

At least one side wheel removably secures to the bottom surface adjacent each of the sides of the sled. Each side wheel inserts in a side wheel pocket provided in the bottom surface of the sled and is secured therein by means of a removable wheel fastening axle. Each wheel fastening axle inserts through an axle opening provided in the side wall adjacent each wheel pocket in order to removably secure the side wheels to the sled.

The wheels are attached to the sled to allow the sled to be used on land and are removed from the sled to allow the sled to be used on snow or on water.

The sled is preferably constructed of materials which permit the sled to float on water.

BRIEF DESCRIPTION OF THE DRAWINGS

FIG. 3 is a bottom plan view of the sled of FIG. 2.

FIG. 4 is a front elevation of the sled of FIG. 2.

FIG. 5 is a front elevation of the sled of FIG. 4, shown with its wheels removed.

FIG. 6 is a left side elevation of the sled of FIG. 5.

FIG. 7 is a bottom plan view of the sled of FIG. 5.

DETAILED DESCRIPTION OF THE PREFERRED EMBODIMENT

Invention

Figure 1:
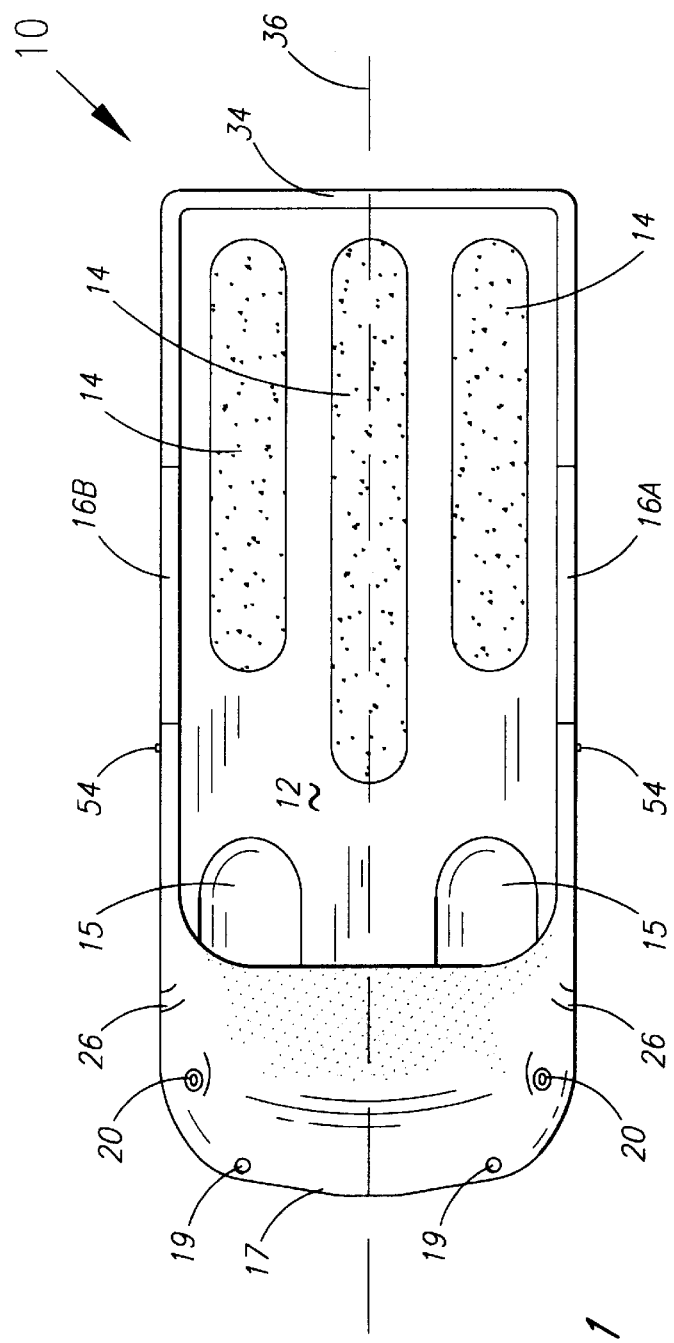
FIG. 1 is a top plan view of a sled constructed in accordance with a preferred embodiment of the present invention.
Figure 2:
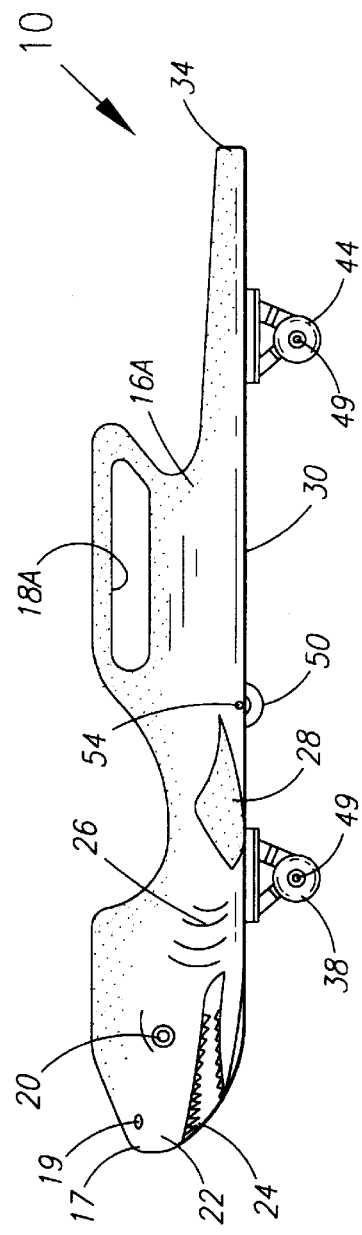
FIG. 2 is a left side elevation of the sled of FIG. 1, shown with its wheels attached.

Referring now to drawings and initially to FIGS. 1 through 4, there is illustrated a sled 10 constructed in accordance with a preferred embodiment of the present invention. FIGS. 5 through 7 also illustrate the sled 10 in a modified form for use on snow or water, as will be explained more fully hereafter.

The sled 10 which is illustrated in FIGS. 1 through 4 is for use on land. The sled 10 is provided with a top surface 12 on which passengers can be seated. The top surface 12 may optionally be provided with non-skid surface areas 14 to prevent passengers from slipping when they are riding upon the top surface 12 of the sled 10. The top surface 12 may optionally be provided with a pair of slight foot indentions 15 adjacent a front end 17 of the sled 10.

The sled 10 is provided with upwardly extending sides 16A and 16B on either side of the top surface 12 to help the passengers remain on the top surface 12 when riding the sled 10. Each side 16A and 16B is provided with a hand opening 18 which can be grasped by the passengers as they ride the sled 10. The front end 17 of the sled 10 extends upward approximately level with the sides 16A and 16B and serves to protect the passengers from injury as the sled 10 is being ridden. The front end 17 is preferably rounded so that it provides minimal resistance to travel and does not contain sharp edges or corners which might injure a passenger.

The front end 17 of the sled 10 is provided with a pair of rope openings 19 therethrough so that one of the rope openings 19 is on either side of the sled 10. Although not illustrated, a rope may be fastened to the sled 10 at the rope openings 19 to provide a means for pulling the sled 10 and to allow a passenger to grasp the rope as they ride the sled 10.

As illustrated in the drawings, the sled 10 may be molded or painted to resemble an animal, such as a shark. In the drawings, the sled 10 has been provided with a pair of shark eyes 20, a shark mouth 22, shark teeth 24, shark gill slits 36 and shark side fins 28 in order to make the sled 10 resemble a shark. Although the sled 10 has been illustrated as molded or painted to resemble an animal, it is not so limited and may be molded or painted to resemble any thing, object or design.

As illustrated in FIGS. 3 and 7, a bottom surface 30 of the sled 10 is provided with parallel runners 32 molded into the bottom surface 30 and extending downward slightly therefrom. These runners 32 extend from the front end 17 of the sled 10 to an opposite rear end 34 of the sled 10 and are parallel with a longitudinal axis 36 of the sled 10. These runners 32, as illustrated in FIGS. 5 through 7, help the sled 10 to normally travel in a path parallel to the longitudinal axis 36 of the sled 10 when the sled 10 is used on snow or on water.

However, when the sled 10 is employed on land, it must be supported on wheels which removably attach to the bottom surface 30 of the sled 10. A front pair of wheels 38 removably secure to the bottom surface 30 of the sled 10 via first fasteners 40 which removably engage first fastener openings 42 provided in the bottom surface 30 adjacent the front end 17 of the sled 10. A rear pair of wheels 44 also removably secure to the bottom surface 30 of the sled 10 via second fasteners 46 which removably engage second fastener openings 48 provided in the bottom surface 30 adjacent the rear end 34 of the sled 10. The sled 10 is supported on land by the front and rear pairs of wheels 38 and 44 which extend downward from the bottom surface 30. Each of the front and rear pairs of wheels 38 and 44 are rotatably supported on a wheel pair axle 49, and each wheel pair axle 49 secures to a mounting bracket 51 as a means for removably securing the front and rear pairs of wheels 38 and 44 to the sled 10.

The sled 10 is also provided with a side wheels 50 which removably secure to the bottom surface 30 so that at least one side wheel 50 is located at each of the two sides 16A and 16B. Each side wheel 50 rotatably secures within a side wheel pocket 52 molded into the bottom surface 30 of the sled 10 and is secured therein by means of a removable wheel fastening axle 54. Each wheel fastening axle 54 inserts through an axle opening 56 provided in each of the sides 16A and 16B adjacent the bottom surface 30 and approximately midway between the front and rear ends 17 and 34 in order to removably secure the side wheels 50 to the sled 10.

The side wheels 50 do not extend downward from the bottom surface 30 as far as do the front and rear pairs of wheels 38 and 44. Thus, the sled 10 is generally not supported by the side wheels 50 until the passenger leans his body to one side, either 16A or 16B, of the sled 10. When the passenger leans to one side, either 16A or 16B, the side wheel 50 located on that side will engage the ground to prevent the sled 10 from falling over on its side and permitting the passenger to steer the sled 10 on land by leaning the passenger's body to one side or the other.

Referring now to FIGS. 5 through 7, the sled 10 is shown with both pairs of front and rear wheels 38 and 44 removed from the sled 10 and with both side wheels 50 removed from the sled 10. The front and rear wheels 38 and 40 may be removed from the sled 10 by disengaging the first and second fasteners 40 and 46 from their associated first and second fastener openings 42 and 48 provided on the bottom surface 30 of the sled 10. Likewise, the side wheels 50 may be removed from the sled 10 by disengaging the wheel fastening axles 54, thus allowing the side wheels 50 to be removed from the side wheel pockets 52 provided in the bottom surface 30 of the sled 10. Once all the wheels 38, 44 and 50 are removed from the sled 10, the sled 10 is free to rest on its bottom surface 30 and runners 32 on either snow or water.

The sled 10 is preferably made of molded plastic or other suitable material which allows the sled 10 to float on water.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A sled for use on land or on snow and water comprising
   a sled provided with a top surface on which a passenger can ride;
   an opposite bottom surface provided on the sled for supporting the sled, runners provided on the bottom surface and extending from a front end to an opposite rear end of the sled;
   front wheels removably secured to the bottom surface adjacent the front end, rear wheels removably secured to the bottom surface adjacent the rear end, and
   said sled provided with a left side and an opposite right side, at least one side wheel removably secured to the bottom surface adjacent each side of the sled, and that extends downward beyond said runners and said runners being provided between said side wheels.

2. A sled according to claim 1 further comprising
   each side of the sled being provided with hand openings as a means for passengers to grasp the sled when riding thereon.

3. A sled according to claim 2 further comprising
   the front end of the sled being provided with rope openings for attaching a rope to the sled.

4. A sled according to claim 3 wherein said front wheels and said back wheels extend downward on the bottom surface beyond said runners, said front wheels and said back wheels extend downward on the bottom surface beyond said side wheels, and said side wheels extend downward on the bottom surface beyond said runners.

5. A sled according to claim 4 wherein each of said runners is parallel with a longitudinal axis of the sled.

6. A sled according to claim 5 further comprising
   non-skid surface areas being provided on the top surface.

7. A sled according to claim 6 further comprising
   foot indentions being provided on the top surface adjacent the front end.

8. A sled according to claim 7 further comprising
   the front wheels rotatably supported on a first wheel pair axle, said first wheel pair axle secured to a first mounting bracket, and said first mounting bracket removably secured to said bottom surface adjacent said front end.

9. A sled according to claim 8 further comprising
rear wheels rotatably supported on a second wheel pair axle, said second wheel pair axle secured to a second mounting bracket, and said second mounting bracket removably secured to said bottom surface adjacent said rear end.

10. A sled according to claim 9 further comprising
first fastening means securing said first mounting bracket to first fastening openings provided in said bottom surface, second fastening means securing said second mounting bracket to second fastening openings provided in said bottom surface.

11. A sled according to claim 10 further comprising
a removably wheel fastening axle removably insertable through an axle opening provided in each side of the sled adjacent the bottom surface, and each said removably wheel fastening axle rotatable securing said side wheels within side wheel pockets provided in the bottom surface adjacent said sides.

12. A sled according to claim 11 wherein said sled is decorated to resemble an animal.

* * * * *